(12) United States Patent
Patel et al.

(10) Patent No.: US 7,097,102 B2
(45) Date of Patent: Aug. 29, 2006

(54) SYSTEM AND METHOD FOR DECODING OPTICAL CODES READ BY AN IMAGER-BASED OPTICAL CODE READER

(75) Inventors: Mehul Patel, Fort Salonga, NY (US); Robert James Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/901,623

(22) Filed: Jul. 29, 2004

(65) Prior Publication Data

US 2006/0022052 A1 Feb. 2, 2006

(51) Int. Cl.
G06K 7/10 (2006.01)

(52) U.S. Cl. ..................... 235/454
(58) Field of Classification Search ........ 235/454, 235/462.01–462.49
See application file for complete search history.

(56) References Cited

U.S. PATENT DOCUMENTS

| | | | |
|---|---|---|---|
| 5,521,366 A * | 5/1996 | Wang et al. ........... 235/454 |
| 5,591,955 A * | 1/1997 | Laser ................. 235/462.06 |
| 5,739,518 A * | 4/1998 | Wang ................. 235/462.09 |
| 5,801,371 A | 9/1998 | Kahn et al. |
| 2003/0062413 A1 | 4/2003 | Gardiner et al. |
| 2003/0168512 A1 | 9/2003 | Longacre, Jr. et al. |

* cited by examiner

*Primary Examiner*—Karl D. Frech
*Assistant Examiner*—Jamara A. Franklin
(74) *Attorney, Agent, or Firm*—Carter DeLuca Farrell & Schmidt, LLP (57) ABSTRACT

A system and method for reading an optical code is provided. The method comprises the steps of imaging at least one target, including acquiring and processing image data corresponding to a series of at least one frame; storing image data corresponding to respective acquired frames of the at least one frame, including at least image data corresponding to a current frame (Frame(N)) and image data corresponding to a previous frame (Frame(N−1)); receiving an actuation signal during Frame(N) indicating initiation of a read operation; retrieving at least a portion of the image data corresponding to Frame (N−1); and performing a decode operation on the retrieved image data.

26 Claims, 5 Drawing Sheets

SYSTEM AND METHOD FOR DECODING OPTICAL CODES READ BY AN IMAGER-BASED OPTICAL CODE READER

BACKGROUND OF THE INVENTION

1. Field of the Invention

This invention relates to optical code readers. In particular, this invention relates to a system and method for decoding optical codes read by imager—based optical code readers.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in either fixed or portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

An example of a conventional optical code is a one-dimensional barcode symbol. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference in its entirety. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described may also be applicable to some associated image recognition or analysis.

Optical code readers may be laser-based or imager-based. In a conventional imager-based optical code reader an imaging engine is provided having an image sensor having a two-dimensional array of cells or photo sensors, such as an area charge coupled device (CCD), which correspond to image elements or pixels in a field of view of the engine. The imaging engine further includes a lens assembly for focusing light incident on the image sensor and associated circuitry coupled to the image sensor outputting an array of electronic signals corresponding to a two-dimensional array of pixel information for the field of view. The electrical signals are digitized and provided as image data to a processor for processing thereof, including processing the image data for decoding the optical code.

Conventionally, an operator aims an optical code reader at a target code and pulls a trigger, which signals the optical code reader to process an acquired image, typically the next image acquired following the trigger pull. Image acquisition is typically performed in accordance with a sequential series of frames. In a system using a conventional 30 frames/sec video stream, a frame occurs approximately every 33 msec. The processing may include a decode operation, where the decode time extends into the next frame.

Minimizing the read time, e.g., time interval from trigger-pull to decode completion, is a high priority for optical code scanners. In commercially available imager-based optical code readers, the read time is relatively long compared to laser-based optical code readers. It would be advantageous to decrease the read time in an imager-based optical code reader for achieving speeds comparable to the speed of a laser-based optical code reader.

The read time includes a sum of the time needed to complete the remaining portion of the current frame (e.g., between 0–33 msec for the example using 30 frames/sec), the time needed for completing the next frame (e.g., 33 msec), and the time needed for performing the decode processing (e.g., 10 msec), totaling at least 43 msec in the example provided. Furthermore, in some optical code reader systems, the read time may further include additional frame(s), such as for processing sensed properties, adjusting parameter settings associated with the imaging or signal processing and acquiring image data or processing image data using the adjusted parameter settings.

In some systems an attempt is made to decrease the read time by beginning processing of the image data once the image data is partially acquired, such as when image data corresponding to a portion of the field of view are acquired (e.g., beginning with the upper portion of the field of view). However, the read time is not significantly decreased if the target optical code lies in a portion of the field of view that is not included in the portion processed that corresponds to the partial acquisition.

Accordingly, it is an aspect of the present invention to provide a system and method in which the read time is significantly reduced for image acquisition and decoding of optical codes by an imager-based optical code reader.

It is a further aspect of the present invention to sample ambient light and adjust parameter settings for signal processing of signals generated by an image sensor of an imager-based optical code reader.

It is still a further aspect of the present objection to reduce the time needed to adjust parameter settings for signal processing of signals generated by an image sensor of an imager-based optical code reader.

It is an additional aspect of the present invention to provide initial parameter settings for signal processing of signals generated by an image sensor of an imager-based optical code reader when the initial parameter settings are optimized for processing signals corresponding to image acquisition performed during a frame preceding trigger activation.

SUMMARY OF THE INVENTION

In an embodiment of a system, in accordance with the present invention, an optical code reader system is provided having an imaging module for imaging at least one target, including acquiring and processing image data corresponding to a series of at least one frame, and at least one storage medium for storing image data corresponding to respective acquired frames of the at least one frame, including at least image data corresponding to a current frame (Frame(N)) and image data corresponding to a previous frame (Frame(N−1)). The optical code reader system further includes a processor assembly including at least one processor for receiving an actuation signal during Frame(N) indicating initiation of a read operation. Furthermore, the processor assembly includes a frame grabber module executable on the at least one processor for retrieving at least a portion of the image data corresponding to Frame (N−1) from the at least one storage medium; and a decoder module executable on the at least one processor for performing a decode operation on the retrieved image data.

In another embodiment of the invention an optical code reader device is provided having the imaging module for imaging at least one target, including acquiring and processing image data corresponding to a series of at least one frame, and at least one storage medium for storing image data corresponding to respective acquired frames of the at least one frame, including at least image data corresponding to a current frame (Frame(N)) and image data corresponding to a previous frame (Frame(N−1)). The optical code reader further includes a processor assembly including at least one processor for receiving an actuation signal during Frame(N) indicating initiation of a read operation. The processor assembly further includes a frame grabber module executable on the at least one processor for retrieving at least a portion of the image data corresponding to Frame (N) from the at least one storage medium; and a decoder module executable on the at least on processor for performing a decode operation on the retrieved image data.

In another embodiment of the invention a method is provided for reading an optical code. The method includes the steps of imaging at least one target, including acquiring and processing image data corresponding to a series of at least one frame; storing image data corresponding to respective acquired frames of the at least one frame, including at least image data corresponding to a current frame (Frame (N)) and image data corresponding to a previous frame (Frame(N−1)); receiving an actuation signal during Frame (N) indicating initiation of a read operation; retrieving at least a portion of the image data corresponding to Frame (N−1); and performing a decode operation on the retrieved image data.

In a further embodiment of the present invention an optical code reading device is provided having an imaging module for imaging at least one target, which includes acquiring and processing image data corresponding to a series of at least one frame, wherein at least one of the acquiring and processing is performed in accordance with at least one adjustable parameter, and an ambient light sensor assembly for sensing at least one property of ambient light and generating an ambient light signal that corresponds to the sensing. The optical code reading device further includes a processor assembly having at least one processor, wherein the processor assembly includes at least one module executable on the at least one processor for receiving an actuation signal during Frame(N) indicating initiation of a read operation, and in response to receipt of the actuation signal accessing at least a portion of image data corresponding to a frame of the series of at least one frame and decoding the accessed image data, and a parameter adjuster module executable on the at least one processor for in response to receipt of the actuation signal, analyzing the ambient light signal in accordance with the analysis adjusting settings of the at least one adjustable parameter before the beginning of Frame(N+2).

In still another embodiment of the invention a method is provided for imaging an optical code. The method includes the steps of imaging at least one target, including acquiring and processing image data corresponding to a series of at least one frame, wherein at least one of the acquiring and processing is performed in accordance with at least one adjustable parameter; sensing at least one property of ambient light; generating an ambient light signal corresponding to the sensing; and receiving an actuation signal during Frame(N) indicating initiation of a read operation. The method further includes the steps of accessing at least a portion of image data corresponding to a frame of the series of at least one frame and decoding the accessed image data in response to receipt of the actuation signal; analyzing the ambient light signal in response to receipt of the actuation signal; and adjusting settings of the at least one adjustable parameter in accordance with results of the analyzing step before the beginning of Frame(N+2).

BRIEF DESCRIPTION OF THE DRAWINGS

Various embodiments of the invention will be described herein below with reference to the figures wherein.

DETAILED DESCRIPTION OF THE PREFERRED EMBODIMENTS

The present invention provides an imager-based optical code reader which uses default parameter settings for imager drive circuitry and/or video processing circuitry such as for exposure and/or gain processing, of the optical code reader which are optimized for imaging while in a state of motion. Upon activation by an actuator during a Frame(N), a read operation is initiated, including performance of a decode operation on image data acquired in a previous frame, Frame((N−1). Since Frame(N−1) was acquired prior to the trigger pull, it is likely that the user was already aimed at the optical code, but that the optical code reader and/or the target code were still somewhat in motion. Hence, a high probability exists for acquiring a decodable image of the target optical code using the default imager drive circuitry parameter settings and for a successful first decode attempt.

In parallel with the decode operation performed during Frame(N), signals output by an ambient light sensor are analyzed, and parameter settings, such as for the video processing circuitry or image driver circuitry are adjusted in accordance with the analysis, so that in the next frame, Frame(N+1), an image will be acquired and/or processed (e.g., digitized) using the adjusted parameter settings. If the first decode attempt was not successful, another decode attempt is performed during Frame(N+1) on data acquired during Frame(N). In a worst case scenario, if the previous decode attempts were unsuccessful, at the beginning of the following frame, Frame(N+2), a decode operation is performed on the image acquired using the adjusted parameter settings during Frame(N+1).

In a conventional imager-based optical code reader, an image is acquired during Frame(N+1). At Frame(N+2) a first decode attempt is made on the data acquired during Frame (N+1). If the decode attempt is not successful, the image acquired during Frame(N+1) is analyzed and imager drive or video processing circuitry parameter settings are adjusted accordingly. At Frame(N+3) an image is acquired using the adjusted settings. At Frame(N+4) a second decode operation is performed on the image acquired with the adjusted settings during Frame(N+3).

Figure 1:
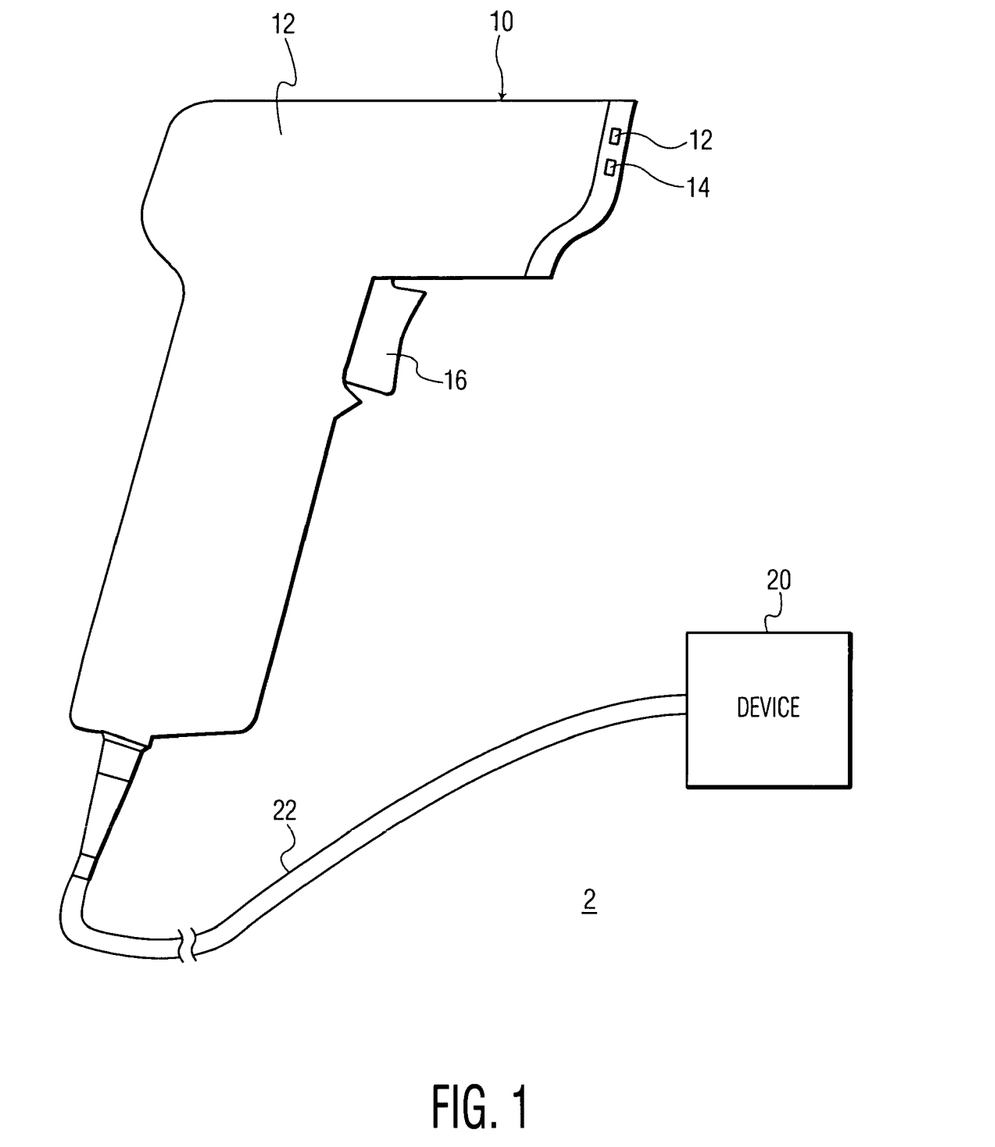
FIG. 1 is a schematic diagram of an optical code reader system in accordance with the present invention.

With reference to FIG. 1 an exemplary optical code reader system 2 is shown including an imager-based optical code reader 10 having a photo sensor array aperture 12 and an ambient light sensor aperture 14. The photo sensor array aperture 12 and the ambient light sensor aperture 14 may be included in one aperture or be separate apertures. The optical code reader system 2 is equipped with an actuator 16, such as a trigger, a switch (hardware or software), which may be activated by a user, a sensor, a processor, a host terminal, etc., for generating an actuation signal upon activation thereof for initiating a read operation. The actuation signal may be generated by the host terminal and received by the optical code reader 10, such as in the form of a command. The optical code reader 10 may be configured as a handheld, portable and/or stationary device. The optical code reader may further be incorporated into another device, such as a PDA or cellular phone.

The optical code reader may be in wired or wireless communication with at least another device 20, such as a host terminal or network via communication interface 22. For example, the optical code reader 10 may be implemented within a system including one or more components, such as a keyboard, display, printer, data storage, application software, and databases. The system may further be in communication with another system or network. Communication interface 22 may be wired or wireless and include, for example, a cable, telephone exchange network, either through a modem or an ISDN interface, an infrared data interface (IRDA) and/or a multi-contact shoe. Data transmitted by the communication interface 22 may include compressed data.

Figure 2:
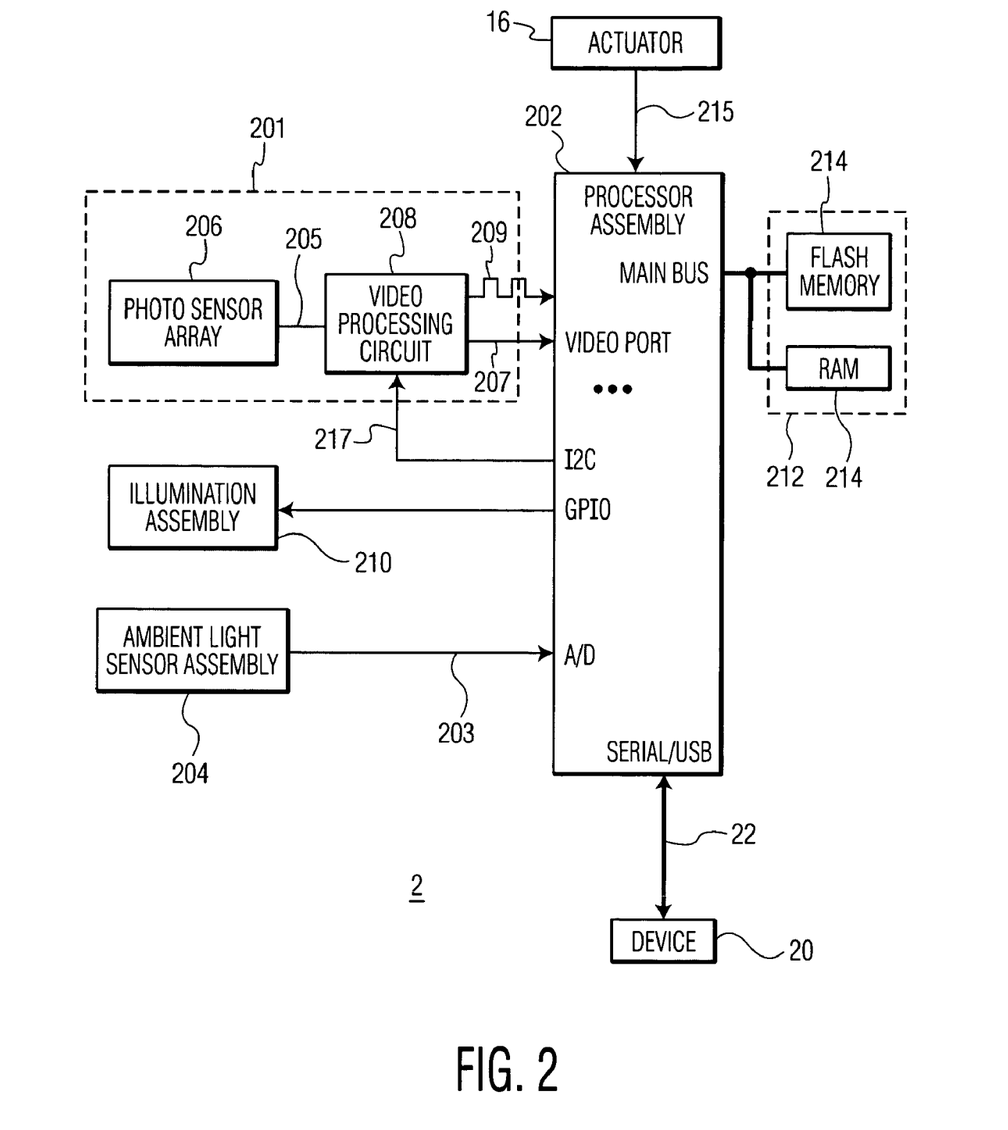
FIG. 2 is a block diagram of components of the optical code reader system shown in FIG. 1.

With reference to FIG. 2 a block diagram depicting exemplary components of the optical code reader system 2 is shown, including a processor assembly 202, an ambient light sensor assembly 204, an imager module 201 including an imager photo sensor array 206 and video processing circuitry 208, an illuminator assembly 210, a storage medium assembly 212, including at least one storage medium device 214, the actuator 16, and the device 20. The ambient light sensor assembly 204 includes one or more photo sensors for sampling ambient light conditions by sensing light transmitted through the ambient light sensor aperture 14. Optics (not shown), including one or more lenses, may optionally be provided for focusing ambient light transmitted through the ambient light sensor aperture 14 onto the ambient light photo sensor assembly 204.

The ambient light sensor assembly 204 is capable of sensing at least one property of the ambient light, such as a range of light intensities, and generating at least one electrical signal, shown as ambient light signal 203, which corresponds to the sensing and is indicative of the ambient light property, e.g., intensity. The ambient light signal 203 may be provided to the processor assembly 202 as an analog signal, such as via an analog to digital (A/D) port that provides A/D conversion. The ambient light signal 203 preferably includes much less information than the image signals 205 or the image data 207, and accordingly processing of the ambient light signal 203 is relatively simple and quick compared to processing of the image signals 205 or the image data 207.

The ambient light sensor assembly 204 may include circuitry for processing the ambient light signal 203 externally from the processor assembly 202. For example, analog circuitry including a comparator may be provided for comparing the ambient light signal 203 to a threshold value, where the results of the comparison are provided to the processor assembly 202. In another example, the ambient light sensor assembly 204 may include A/D circuitry for converting the ambient light signal 203 from an analog signal into a digital signal before providing the ambient light signal 203 to the processor assembly 202.

A system and method for sensing ambient light in an optical code reader is described in U.S. patent application Ser. No. 10/803,669, entitled "SYSTEM AND METHOD FOR SENSING AMBIENT LIGHT IN AN OPTICAL CODE READER", filed on Mar. 18, 2004, and assigned to Symbol Technologies Inc., the entire contents of which are incorporated herein by reference in their entirety.

The imager module 201 constantly acquires an image corresponding to a field of view (FOV) of the imager module 201, and provides corresponding image data as a series of frames to the processor assembly 202. The imager photo sensor array 206 includes an array of photo sensors for sensing light reflected from objects lying within the field of view (FOV) of the optical code reader 10 which is transmitted through the photo sensor array aperture 14. The image photo sensor array 206 generates an array of electrical signals representing an image which correspond to the sensing, shown here as image signals 205, which are provided to the video processing circuitry 208. Optics (not shown) may be provided for focusing the light transmitted through the photo sensor array aperture 14 onto the photo sensor array 206. The photo sensor array 206 may include a CCD or other similar device.

The video processing circuitry 208 includes circuitry for affecting image acquisition and processing (e.g., digitizing) the image signals 205 for generating image data 207. The video processing circuitry 208 constantly outputs a series of one or more frames of image data 207 to the processor assembly 202, which provides the received frames of the series of frames of image data 207 via the processor assembly 202 to the storage medium assembly 212 for storage thereof. In addition, the video processing circuitry 208 outputs a frame synch signal 209 to the processor assembly 202, which is used for synchronizing the frame generation, transmission and/or processing thereof. In the example shown, the video processing circuitry 208 interfaces with the processor assembly 202 by way of a video port.

An illumination assembly 210 may be provided including one or more light sources, such as light emitting diodes (LEDs), xenon tubes or laser sources, for providing illumination during sensing by the photo sensor array 206. The illumination assembly 210 may operate in accordance with at least one adjustable parameter, for generating a range of intensities of illumination for a range of durations, which may be controllable manually or automatically, as discussed further below. Preferably, the illumination intensity is selectable in accordance with an adjustable illumination intensity parameter, and the duration of the illumination is selectable in accordance with an adjustable illumination duration parameter. In the example shown, the illumination assembly 210 interfaces with the processor assembly 202 via a general purpose I/O port (GPIO).

The sensors of the ambient light sensor assembly 204 may be included in photo sensor array 206, where the photo sensor array 206 includes one or more photo sensors of the ambient light sensor assembly 204. For example, the ambient light sensor assembly 204 and the photo array sensor 206 may be provided on the same circuit board. Furthermore, photo sensors of at least one of the ambient light sensor assembly 204 and/or the photo array sensor 206 may be disabled when photo sensors of the other of the ambient light sensor assembly 204 and the photo array sensor 206 are enabled.

Preferably, the number of photo sensors of the ambient light sensor assembly 204 is significantly less than the number of photo sensors included in the array of photo sensor array 206. The photo sensors of the photo sensor array 206 that are not included in the ambient light sensor assembly 204 may be "closed" (i.e., disabled) when a scan operation is not being performed. The sensors may be "closed", such as by physically blocking light from striking the sensors, or by electronically blocking generation of electrical signals by the blocked sensors, transfer of the electrical signals, or processing of the electrical signals, such as digitizing, image processing and/or decoding thereof.

The ambient light sensor assembly 204 may be dedicated to sensing ambient light only, and may be "closed" when a scan operation is being performed, or alternatively may be used for ambient light sensing as well as scan operations, or a combination thereof (where a portion of the ambient light sensor assembly 204 are dedicated to the ambient light sensing). The ambient light sensor assembly 204 may be distributed among the sensors of the photo sensor array 206 or may be positioned as a group, or a combination thereof. As mentioned above, only one aperture, including the ambient light sensor aperture 12 and the photo sensor array aperture 14 may be provided for transmitting light to the ambient light sensor assembly 204 and the photo sensor array 206. The FOV of the ambient light sensor 204 may or may not coincide or overlay the FOV of the photo sensor array 206.

Figure 3:
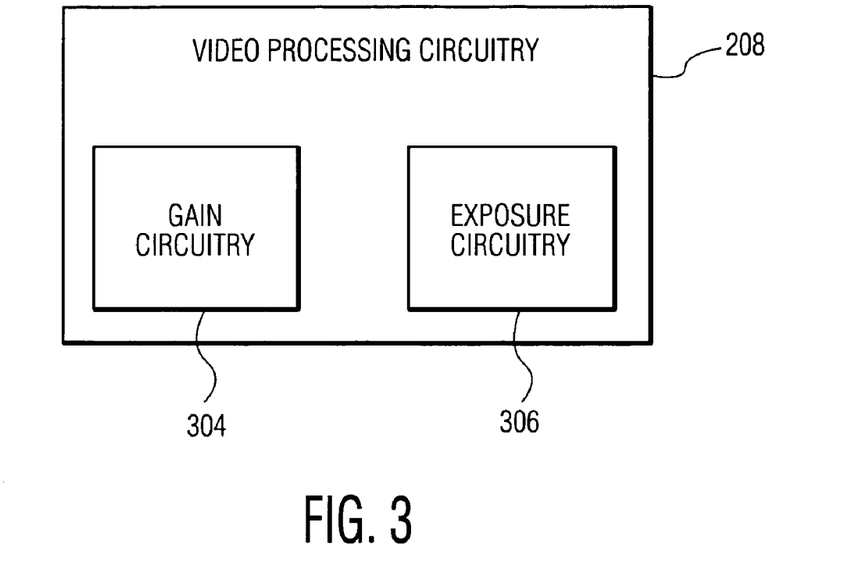
FIG. 3 is a block diagram of components of video processing circuitry of the optical code reader system shown in FIG. 1.

With respect to FIG. 3, the video processing circuitry 208 includes at least gain circuitry 304 and/or exposure circuitry 306 for controlling exposure during image acquisition and gain processing of the image signals 207. The gain and exposure processing each operate in accordance with respective parameter settings, which are adjustable, as described further below.

The gain circuitry 404 includes circuitry, such as gain amplifiers, for gain processing typically used for A/D conversion. The gain circuitry 404 processes at least a portion of the image signals 205 for processing gain thereof in accordance with an adjustable gain parameter. The image signals 205 may be processed by additional circuitry (not shown), such as for buffering, filtering and/or digitizing the plurality of second electronic signals for preparing the image signals 205 for processing by the processor assembly 202.

The exposure circuitry 406 controls the exposure time (i.e., integration time), such as by controlling a shutter, which may include controlling an electronic shutter or a mechanical shutter. The exposure circuitry 406 controls opening of the shutter (electrical or mechanical) for an amount of time in accordance with an adjustable exposure parameter. The exposure circuitry 406 may generate a control signal for controlling the amount of time the shutter is open. For a mechanical shutter, the control signal may be converted to an analog signal having a characteristic (such as voltage) that corresponds to the value of the control signal. The shutter may be controlled for opening the shutter an amount of time that corresponds to a magnitude of the characteristic of the analog control signal.

Turning again to FIG. 2, the storage medium assembly 212 includes at least one storage device 214, such as RAM, flash memory, magnetic drum, CD-ROM, etc. The at least one storage device 214 may be internal, external, or a combination thereof to the processor assembly 202. The storage medium assembly 212 is accessible by the processor assembly 202, such as via a main bus.

The processor assembly 202 may include one or more analog components and/or one or more digital processors, such as a microprocessor, a Field Programmable Gate Array (FPGA), etc. Further, the device 20 and the processor assembly 202 may share resources for performing their respective processing functions. The one or more processors of the processor assembly 202 may be integrated within the optical code reader 10 and/or in one or more devices 20 remote from the optical code reader 10; may be in data communication (wired or wireless) with one another; and/or may operate independently of one another.

The actuator 16, generates actuation signal 215 upon activation of the actuator 16. As described above, the actuation signal 215 may be generated by hardware, such as a switch or trigger on the optical code reader 10 or the device 20; or by software, such as via a command generated by a processor, such as processor assembly 202 or the device 20, such as a host terminal.

Figure 4:
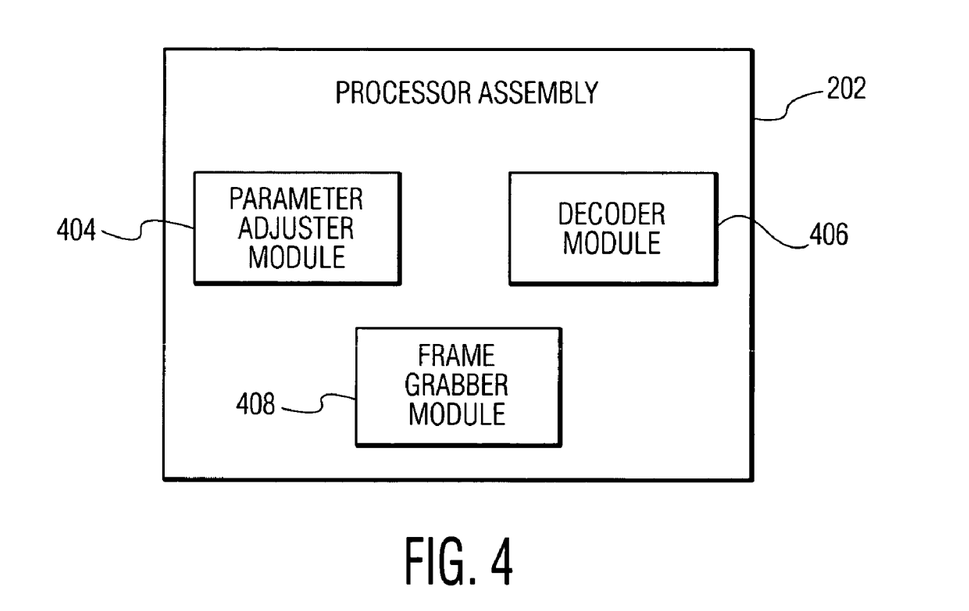
FIG. 4 is a block diagram of components of a processor assembly of the optical code reader system shown in FIG. 1.

With reference to FIG. 4, the processor assembly 202 executes several software modules including a parameter adjuster module 404, a decoder module 406 and a frame grabber module 408. Each module includes a series of programmable instructions executable on the processor assembly 202. The series of programmable instructions can be stored on a computer-readable medium, such as RAM, a hard drive, CD, smart card, 3.5" diskette, etc., or transmitted via propagated signals for being executed by the processor assembly 202 for performing the functions disclosed herein and to achieve a technical effect in accordance with the invention. The processor assembly 202 is not limited to the software modules described. The functions of the respective software modules may be combined into one module or distributed among a different combination of modules.

The parameter adjuster module 404 analyzes the ambient light signal 203 and adjusts the parameter settings of the video processing circuitry 208 or image driver circuitry in accordance with the analysis. Processing and analyzing the ambient light signal 203 involves much less processing than processing performed on the image data 207, and accordingly involves much less time. The parameter adjuster module 404 also sets the parameter settings to default values upon completion of a read operation and before beginning a new read operation. The decoder module 406 performs decode operations, including receiving data, performing a decode algorithm on the data and outputting decoded information upon a successful decode operation. The frame grabber module 408 retrieves data corresponding to the appropriate frame or portion thereof from the storage medium assembly 212 so that the data can be further processed, such as decoded. The image module 201 provides a constant stream of image data as a series of frames which are stored by the storage medium and available to the frame grabber module 408.

Figure 5:
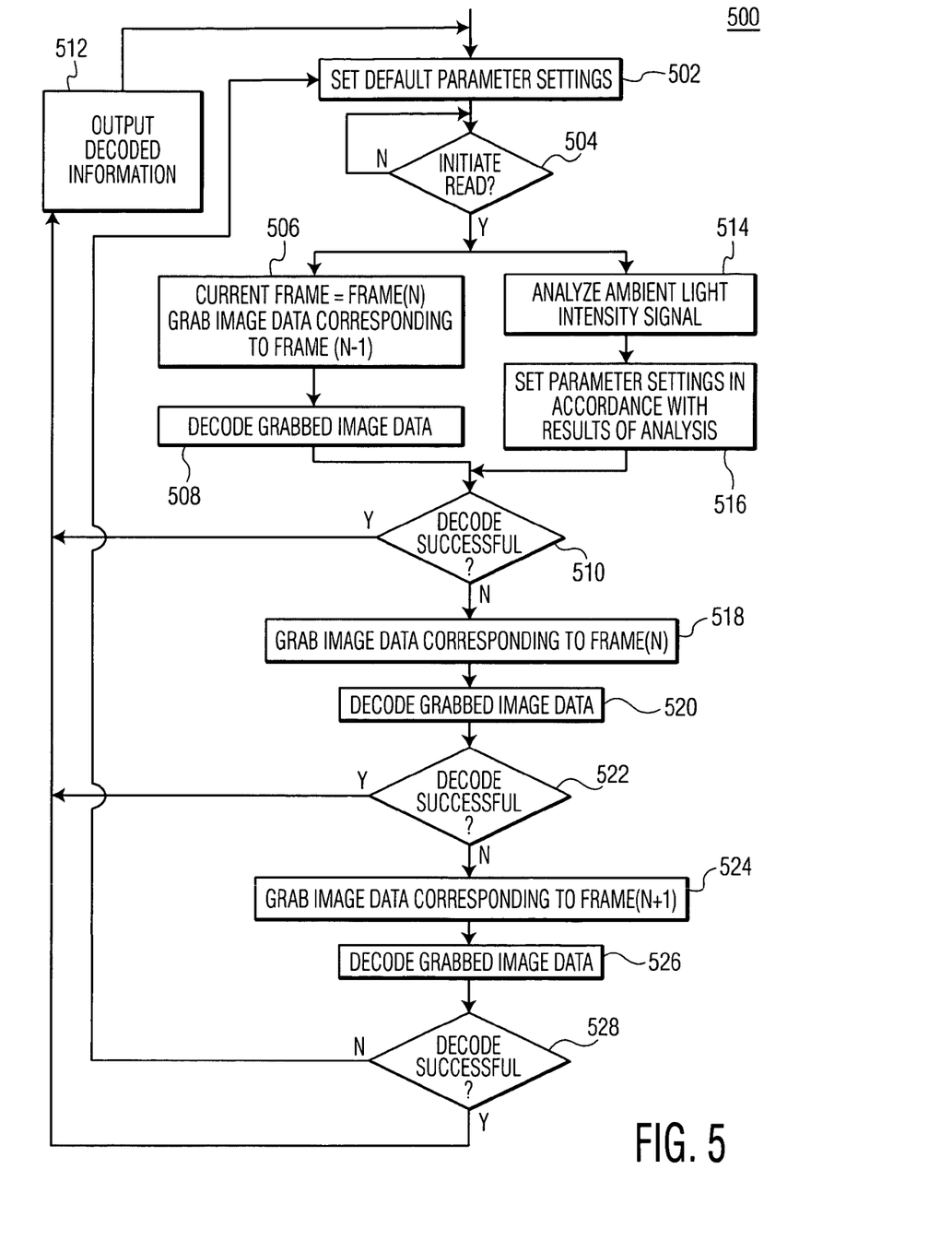
FIG. 5 is a flowchart of steps executed by the processor assembly shown in FIG. 4.

With respect to FIG. 5, an exemplary flowchart 500 showing steps performed by the processor assembly 202 is provided. At step 502, the parameter adjuster module 404 sets parameter settings for the gain and/or exposure circuitry to default values. Step 502 is executed prior to beginning a read operation, including at the completion of a previous read operation. The default values are optimized for processing image signals acquired in a state of motion. Such optimization is desired since the first image data to be processed is likely to be acquired in a state of motion. As discussed further below, upon activation of the actuator 16 for initiation of a read operation, the actuation signal 215 is received and processed by the processor assembly 202 during a current frame, Frame (N). The image data to be first processed corresponds to the frame which occurred prior to activation of the actuator, Frame(N−1).

Since Frame(N−1) occurred prior to activation of the actuator 16, it is likely that the user was completing aiming of the optical code reader 10 towards the target optical code (or vice versa), and therefore it is likely that at least one of the optical code reader 10 and the target optical code were in motion. In order to counteract the movement for minimizing blurring of the image data, the parameter settings for the gain circuitry 304 and/or exposure circuitry 306 are set to settings optimized for minimizing the motion effect.

Accordingly, the default values for the gain parameter for the gain circuitry 304 is preferably set to a maximum value (MAX), and the exposure parameter for the exposure circuitry 306 is preferably set to 2 msec. In the exemplary embodiment shown in FIG. 2, the parameter settings are output by the processor assembly 202 to the video processing circuitry 208 via an I2C bus.

At step 504, the processor assembly 202 waits for receipt of the actuation signal 215, which indicates initiation of a read operation. Upon receipt of the actuation signal 215, step 506 is executed, where the frame grabber module 408 grabs at least a portion of the image data that corresponds to Frame(N−1) from the storage medium assembly 212. In the example provided, the image data grabbed at step 506 is a full set of image data corresponding to Frame(N−1). However, it is contemplated, that the image data grabbed at step 506 may be a portion of image data corresponding to Frame(N−1).

At step 508, the grabbed image data are then provided to the decoder module 406 for performing a decode operation, including decoding the portion of the image data that corresponds to an imaged optical code, and generating decoded information. At step 510, a determination is made if the decode operation was successful (e.g., the grabbed image data were successfully decoded and decoded information is available). When the decode operation is successful, step 512 is executed, at which the decoded information is output by the decoder module 406, such as for providing (e.g., displaying) to the user and/or providing to a host processor for further processing thereof, such as for processing a transaction, updating a database (e.g., inventory), etc. Next, step 502 is executed for setting the default parameter settings and waiting for initiation of a next read operation.

Thus, if the decode operation performed at step 508 was successful, the decoded information is output very soon after the activation of the actuator 16. In accordance with the present example, the decoded information is output approximately 10 ms after activation of the actuator 16. The frame duration is 33 msec. Accordingly, depending at what point during Frame(N) the actuator activation occurred, the decoded information is output before data acquisition corresponding to Frame(N+1) is completed, and preferably before the data acquisition corresponding to Frame(N+1) begins.

Substantially simultaneous with execution of at least one of steps 506, 508 and 510, at least one of steps 514 and 516 are executed as described below (e.g., via parallel processing). At step 514, the parameter adjuster module 404 processes the digitized ambient light signal 203 (or the results of external processing, such as results of comparison to a threshold value by way of a comparator, as described above). The ambient light analyzer module 404 determines what adjustments need to be made to the illumination intensity, illumination duration, gain and/or exposure parameters for optimizing imaging under the ambient light conditions sensed by the ambient light sensor assembly 204.

At step 516, the parameter adjuster module 404 adjusts settings for the illumination intensity, illumination duration, gain and/or exposure parameters by generating parameter adjustment signals 217 and providing the parameter adjustment signals 217 to the video processing circuitry 208. Accordingly, the parameters of the illumination assembly 210, gain module 304 and/or exposure module 306, are adjusted for use during the next acquisition of image data which would preferably occur during Frame(N+1) and/or processing of data (e.g., effective immediately for current processing of image data or effective for processing of image data corresponding to the next acquisition of image data, as desired).

Upon completion of steps 514 and 516, either step 512 or step 518 are executed in accordance with the determination results of step 510. If it was determined at step 510 that the decode operation was unsuccessful, then step 518 is performed. At step 518, at least a portion of the image data corresponding to Frame(N) are grabbed from storage medium assembly 212. In the example provided, the image data grabbed at step 518 is a full set of image data corresponding to Frame(N). However, it is contemplated, that the image data grabbed at step 518 may be a portion of image data corresponding to Frame(N).

The image data grabbed at Frame(N) were acquired using the default parameter settings for gain and/or exposure. A portion of Frame(N) (the portion preceding activation of the actuator 16) is likely to have been acquired in a state of motion. While the amount of time that passed between acquisition of Frame(N−1) and Frame(N) is very short, it is possible that the conditions under which the data corresponding to Frame(N) were acquired differ from the conditions under which the data corresponding to Frame(N−1) were acquired (e.g., the user had achieved a different aim at the target optical code). At step 520 a decode operation is performed on the grabbed image data.

At step 522, a determination is made if the decode operation performed at step 520 was successful. When the decode operation is determined to be successful, step 512 is executed, at which the decoded information is output by the decoder module 406. Next, step 502 is executed for setting the default parameter settings and waiting for initiation of a next read operation.

Thus, if the decode operation performed at step 520 was successful, the decoded information is output very soon after the beginning of Frame(N+1). In accordance with the present example, the decoded information is output approximately 10 ms after the beginning of Frame(N+1).

If the decode operation was determined to be unsuccessful, steps 524 and 526 are executed. At step 524, at least a portion of image data corresponding to Frame(N+1) are grabbed from the storage medium assembly 212. In the example provided, the image data grabbed at step 524 is a full set of image data corresponding to Frame(N+1). However, it is contemplated, that the image data grabbed at step 524 may be a portion of image data corresponding to Frame(N+1). The image data corresponding to Frame(N+1) were acquired using the adjusted parameter settings for illumination intensity, illumination duration, gain and/or exposure. At step 526, a decode operation is performed on the grabbed image data.

At step 528, a determination is made if the decode operation performed at step 526 was successful. When the decode operation is determined to be successful, step 512 is executed, at which the decoded information is output by the decoder module 406. Next, step 502 is executed for setting the default parameter settings and waiting for initiation of a next read operation.

Thus, if the decode operation performed at step 526 was successful, the decoded information is output very soon after the beginning of Frame(N+2). In accordance with the present example, the decoded information is output approximately 10 ms after the beginning of Frame(N+2).

If the decode operation was determined to be unsuccessful, the steps executed are in accordance with design choice. In the example shown, the failed read attempt is aborted and control is passed to step 502 for setting the default parameter settings and waiting for initiation of a next read operation. No decoded data were output. It is contemplated that further sensing, adjusting and/or processing may be performed and further decoding attempted before aborting the read operation. It is also contemplated that upon a read failure, a message or indication may be provided to the user for communicating to the user that the read operation failed.

It is contemplated that at steps 506, 518 and/or 524 the image data grabbed includes a portion of image data corresponding to the particular frame being processed at the respective step, and that several iterations may be performed for grabbing respective successive portions of image data corresponding to the particular frame and attempting a decode operation on the grabbed image data until a condition is met, such as a successful decode occurs, a sufficient decode attempts are performed on the particular frame, or a timeout condition occurs. The successive portions may be in accordance with availability of image data as it is acquired or may be various selected portions of the image data in accordance with design choice.

Figure 6:
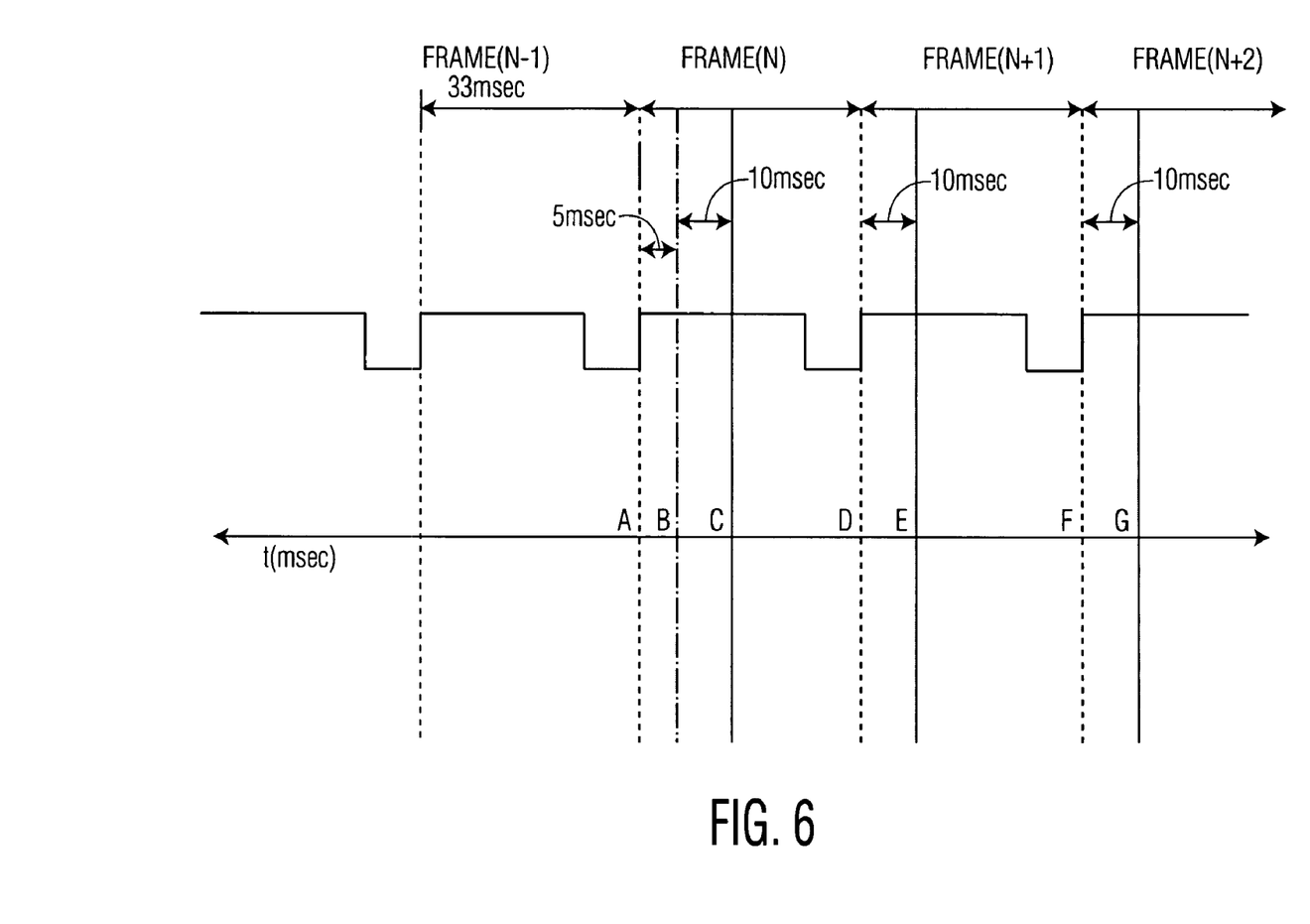
FIG. 6 is a timing diagram showing operation of the optical code reader system shown in FIG. 1.

With reference to FIG. 6, a timeline 600 is shown for several cases of an exemplary read operation. A series of frames are shown, where the duration of each frame is approximately 33 msec. Activation of the actuator 16 occurs during Frame(N), which may be 0–33 msec from the beginning of Frame(N) shown at point A. In the example shown, the actuation signal 215 is received and processed at point B, which occurs approximately 5 msec after point A. Preferably, image data is grabbed and a decode operation is performed, such as described with respect to steps 506, 508 of FIG. 5, immediately upon receipt of the actuation signal 215. If desired, performance of steps 506, 508 may be performed or reiterated using a different portion of data at a selected time after receipt of the actuation signal 215. In the current example, the grab data and decode operation takes approximately 10 msec. Accordingly, a successful decode operation performed at step 508, which is a best case, is completed at point C, which occurs approximately 10 msec after the beginning of the read operation at point B.

In the next case, image data is grabbed and a decode operation is performed, such as described with respect to steps 518 and 520 beginning at the beginning of Frame(N+1) (shown as point D), and completed at point E, which occurs 10 msec later. If desired, performance of steps 518, 520 may be performed or reiterated using a different portion of data at a selected time before or after point D.

In a worst case, image data is grabbed and a decode operation is performed, such as described with respect to steps 524 and 526 beginning at the beginning of Frame(N+2) (shown as point F) and completed at step G, which occurs 10 msec later. If desired, performance of steps 524, 526 may be performed or reiterated using a different portion of data at a selected time before or after point F.

Accordingly, the best case is successfully completed at point C, which occurs 10 msec after the beginning of the read operation. The next case is successfully completed at point E, which occurs 38 msec after the beginning of the read operation. The worst case is successfully completed at point G, which occurs 71 msec after beginning the read operation. It is contemplated that the exemplary cases above may be improved with quicker decode operations, processing portions of data corresponding to the particular frames, performing steps 518, 520 before point D, and/or performing steps 524, 526 before point F.

In the best case of a read operation performed by a conventional optical code reading device, decoding is completed at approximately point G, which is 71 msec after beginning the read operation, and which concurs with the worst case of the present invention. In a conventional optical code reader device, after activation of an actuator, decoding is begun at the beginning of Frame(N+2) after grabbing data which were acquired in the next full frame (Frame(N+1)) following receipt of the actuation signal 215. The data acquired in Frame(N+1) are analyzed, and adjustments may be made to exposure and gain accordingly during Frame ((N+2). Not until Frame(N+3) is data acquired and/or processed using the adjusted parameter settings, and the same data are not decoded until Frame(N+4).

It is contemplated that the optical code reader system 2 reduces read time relative to a conventional optical code reader system by any combination of the techniques described above, including setting default settings optimized for image acquisition in a state of motion; upon activation of the actuator for initiation of a read operation, grabbing data corresponding to the previous frame and decoding the grabbed data; sensing ambient light and processing the sensing results for adjusting parameter settings immediately after activation of the actuator, preferably in the same frame as activation of the actuator in order that data acquired in the next frame will be acquired and/or processed in accordance with the adjusted parameters; grabbing data corresponding to the frame in which activation of the actuator occurred and decoding the grabbed data; grabbing data corresponding to the frame in which the image was acquired and/or processed using the adjusted parameters and decoding the grabbed data.

It is further contemplated that if the actuator is activated at or close to the end of Frame(N), grabbing of the data corresponding to Frame(N) may be performed while grabbed data corresponding to Frame(N−1) are still being processed, e.g., decoded, or immediately thereafter. The processing of the ambient light signal and adjusting of the parameter settings will be performed at the earliest opportunity for the earliest possible image acquisition and/or processing thereof using the adjusted parameters, even where the adjusted parameters may be used for a portion of an image acquisition and/or processing thereof.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. An optical code reader system comprising:
   an imaging module for imaging at least one target, said imaging including acquiring and processing a constant stream of image data during a series of at least two frames;
   at least one storage medium for storing image data acquired during respective frames of the series of at least two frames; and
   a processor assembly including at least one processor for receiving an actuation signal during Frame(N) of the series of at least two frames, said receipt of said actuation signal indicating initiation of a read operation, the processor assembly comprising:
      a frame grabber module executable on the at least one processor for retrieving at least a portion of image data acquired during a frame of the series of at least two frames that is prior to Frame (N) from the at least one storage medium; and
      a decoder module executable on the at least one processor for performing a decode operation on the retrieved image data.

2. The optical code reader in accordance with claim 1, further comprising:
   an ambient light sensor assembly for sensing at least one property of ambient light and generating an ambient light signal corresponding to the sensing;
   wherein the processor assembly further comprises a parameter adjuster module executable on the at least one processor for analyzing the ambient light signal and adjusting settings of at least one parameter of the imaging module used for at least one of acquiring and processing the image data in accordance with the analysis.

3. The optical code reader in accordance with claim 2, wherein the parameter adjuster module performs at least one of the analyzing and adjusting substantially simultaneously with at least one of the retrieving by the frame grabber module and the performing a decode operation by the decode module.

4. The optical code reader in accordance with claim 2, wherein the imager module includes an image sensor array for sensing incident light reflected from a target and generating a plurality of image signals corresponding to the sensing, and at least one of gain circuitry for processing gain of the plurality of image signals in accordance with a gain parameter that determines the gain, exposure circuitry for controlling exposure time of the image sensor array in accordance with an exposure parameter that determines the exposure time, and an illumination assembly for providing illumination during the sensing in accordance with at least one of an illumination intensity parameter that determines the intensity of the illumination, and an illumination duration parameter that determines the duration of the illumination; and
   wherein the at least one parameter includes at least one of the gain parameter, the exposure parameter, the illumination intensity parameter and the illumination duration parameter.

5. The optical code reader in accordance with claim 2, wherein at least one of the analyzing the ambient light signal and adjusting the at least one parameter is performed before the beginning of Frame(N+1).

6. The optical code reader in accordance with claim 2, wherein a successful decode operation is performed on image data that was at least one of acquired and processed in accordance with the adjusted at least one parameter before the beginning of Frame(N+4).

7. The optical code reader in accordance with claim 2, wherein prior to initiating the read operation, the settings for the at least one parameter are initialized to default settings which are optimized for at least one of acquiring and processing image data in a state of motion.

8. The optical code reader in accordance with claim 1, wherein performance of at least one of retrieving at least a portion of the image data acquired during the frame prior to Frame (N) from the at least one storage medium and performing the decode operation on the retrieved image data is performed before the beginning of Frame(N+1).

9. The optical code reader in accordance with claim 1, wherein:
   the processor assembly further performs at least one iteration of:
      determining if the decode operation performed on the previously retrieved image data was successful; and if not:
         the frame grabber module retrieves different image data than the previously retrieved image data from the at least one storage medium, and the decoder module performs a decode operation on the retrieved different image data.

10. The optical code reader in accordance with claim 1, wherein a successful decode operation is performed before the beginning of Frame(N+2).

11. An optical code reader device comprising:
    an imaging module for imaging at least one target, said imaging including acquiring and processing a constant stream of image data during a series of at least two frames;
    at least one storage medium for storing image data acquired during respective frames of the series of at least two frames; and
    a processor assembly including at least one processor for receiving an actuation signal during Frame(N) of the series of at least two frames, said receipt of said actuation signal indicating initiation of a read operation, the processor assembly comprising:
       a frame grabber module executable on the at least one processor for retrieving at least a portion of the image data acquired during Frame (N) or prior to Frame(N) from the at least one storage medium; and
       a decoder module executable on the at least one processor for performing a decode operation on the retrieved image data.

12. The optical code reader in accordance with claim 11, wherein the frame grabber module retrieves data acquired during a frame of the series of at least two frames that is prior to Frame(N) and the decoder module performs a decode operation on the retrieved image data acquired during the frame prior to Frame(N).

13. A method for reading an optical code comprising the steps of:
    imaging at least one target, said imaging including acquiring and processing image data during a series of at least two frames;

storing image data acquired during respective acquired frames of the series of at least two frames;

receiving an actuation signal during Frame(N) of the series of at least two frames, said receipt of said actuation signal indicating initiation of a read operation;

retrieving at least a portion of image acquired during a frame of the series of at least two frames that is prior to Frame (N); and performing a decode operation on the retrieved image data.

14. The method in accordance with claim 13, further comprising the steps of:

sensing at least one property of ambient light;

generating an ambient light signal corresponding to the sensing;

analyzing the ambient light signal; and adjusting settings of at least one parameter of the imaging module used for at least one of acquiring and processing the image data in accordance with the analyzing.

15. The method in accordance with claim 14, further comprising the steps of:

sensing incident light reflected from a target;

generating a plurality of image signals corresponding to the sensing; and at least one of processing gain of the plurality of image signals in accordance with a gain parameter that determines the gain, controlling exposure time of for sensing the reflected light in accordance with an exposure parameter that determines the exposure time, generating illumination during the sensing in accordance with at least one of an illumination intensity parameter that determines the intensity of the illumination and an illumination duration parameter that determines the duration of the illumination;

wherein the at least one parameter includes at least one of the gain parameter, the exposure parameter, the illumination intensity parameter and the illumination duration parameter.

16. The method in accordance with claim 14, wherein the performing a decode operation step is performed successfully on image data that was at least one of acquired and processed in accordance with the adjusted at least one parameters before the beginning of Frame(N+3).

17. The method in accordance with claim 14, further comprising the step of prior to initiating the read operation, initializing settings for the at least one parameter to default settings which are optimized for at least one of acquiring and processing image data in a state of motion.

18. The method in accordance with claim 14, wherein at least one of the analyzing and adjusting steps is performed before the beginning of Frame(N+2).

19. The method in accordance with claim 13, further comprising the step of determining if the decode operation performed on the image data acquired during the frame prior to Frame(N) was successful; and if not:

retrieving at least a portion of the image data to acquired during Frame(N); and performing a decode operation on the retrieved image data acquired during Frame(N).

20. The method in accordance with claim 13, wherein the performing a decode operation step is performed successfully before the beginning of Frame(N+1).

21. An optical code reading device comprising:

an imaging module for imaging at least one target, said imaging including acquiring and processing a constant stream of image data during a series of at least two frames, wherein at least one of the acquiring and processing is performed in accordance with at least one adjustable parameter;

an ambient light sensor assembly for sensing at least one property of ambient light and generating an ambient light signal that corresponds to the sensing; and a processor assembly including at least one processor, wherein the processor assembly comprises:

at least one module executable on the at least one processor for receiving an actuation signal during Frame(N) of the series of at least two frames, said receipt of said actuation signal indicating initiation of a read operation, and in response to receipt of the actuation signal accessing at least a portion of image data acquired during a frame of the series of at least two frames and decoding the accessed image data; and a parameter adjuster module executable on the at least one processor for analyzing an ambient light signal corresponding to sensing of the at least one property of ambient light preformed during a frame of the series of at least two frames prior to Frame(N) or during Frame(N), and in accordance with the analysis adjusting a setting of the at least one adjustable parameter before the beginning of Frame(N+2).

22. The optical code reader device according to claim 21, wherein the parameter adjustment module adjusts the settings of the at least one adjustable parameter before the beginning of Frame(N+1).

23. The optical code reader device according to claim 21, wherein the imager module includes an image sensor array for sensing incident light reflected from a target and generating a plurality of image signals corresponding to the sensing and at least one of gain circuitry for processing gain of the plurality of image signals in accordance with a gain parameter that determines the gain, exposure circuitry for controlling exposure time of the image sensor array in accordance with an exposure parameter that determines the exposure time, and an illumination assembly for providing illumination during the sensing in accordance with at least one of an illumination intensity parameter that determines the intensity of the illumination, and an illumination duration parameter that determines the duration of the illumination; and wherein the at least one adjustable parameter includes at least one of the gain parameter, the exposure parameter, the illumination intensity parameter and the illumination duration parameter.

24. A method for imaging an optical code comprising the steps of:

imaging at least one target, said imaging including acquiring and processing a constant stream of image data during a series of at least two frames, wherein at least one of the acquiring and processing is performed in accordance with at least one adjustable parameter;

sensing at least one property of ambient light;

generating an ambient light signal corresponding to the sensing;

receiving an actuation signal during Frame(N) indicating initiation of a read operation;

accessing at least a portion of image data acquired during a frame of the series of at least two frames and decoding the accessed image data in response to receipt of the actuation signal;

analyzing an ambient light signal corresponding to sensing of the series of at least one property of ambient light preformed during a frame of the at least two frames prior to Frame(N) or during Frame(N); and adjusting settings of the at least one adjustable parameter in accordance with results of the analyzing step before the beginning of Frame(N+2).

25. The method according to claim 24, wherein adjusting settings step is preformed before the beginning of Frame (N+1).

26. The method in accordance with claim 24, further comprising the steps of:

sensing incident light reflected from a target;

generating a plurality of image signals corresponding to the sensing; and at least one of processing gain of the plurality of image signals in accordance with a gain parameter that determines the gain, controlling exposure time of for sensing the reflected light in accordance with an exposure parameter that determines the exposure time, generating illumination during the sensing in accordance with at least one of an illumination intensity parameter that determines the intensity of the illumination and an illumination duration parameter that determines the duration of the illumination;

wherein the at least one adjustable parameter includes at least one of the gain parameter, the exposure parameter, the illumination intensity parameter and the illumination duration parameter.

* * * * *